Feb. 8, 1927.
F. T. POWERS
1,617,079
PHOTOGRAPHIC APPARATUS
Original Filed Feb. 19, 1918    2 Sheets-Sheet 1
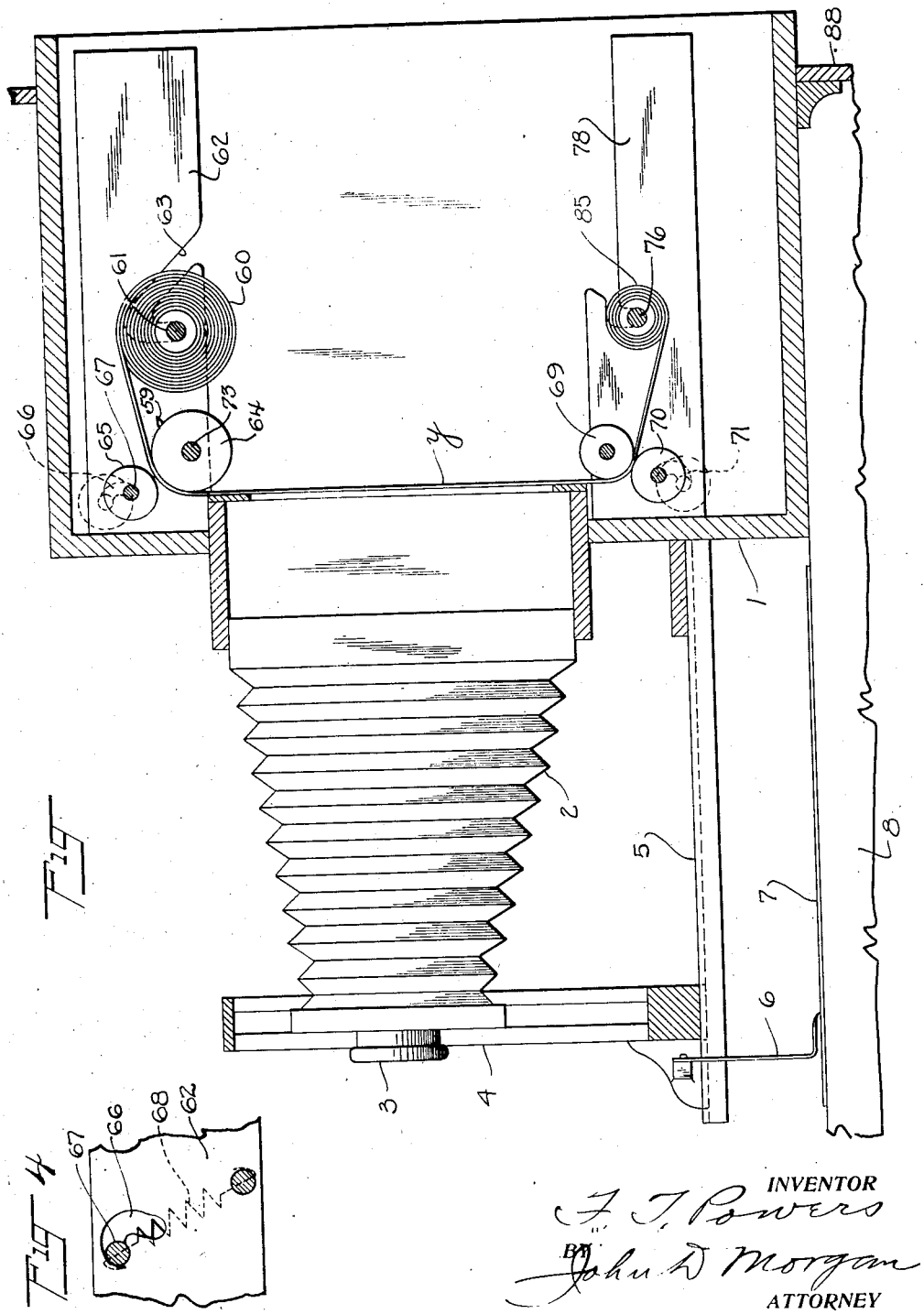

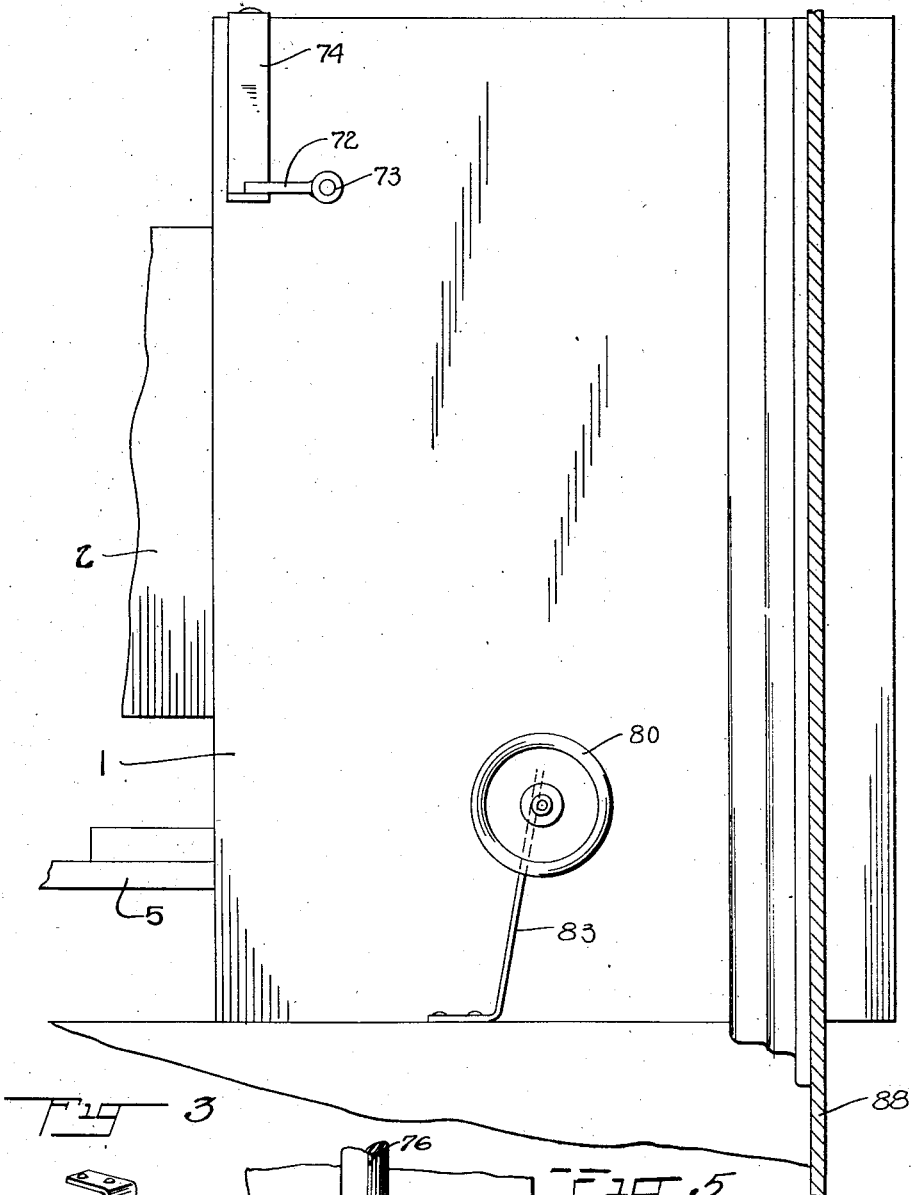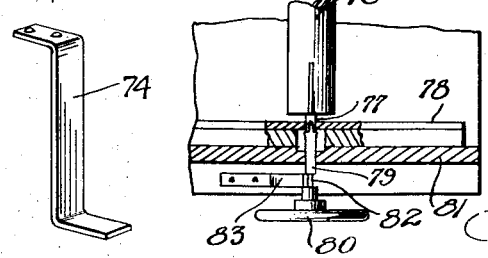

Patented Feb. 8, 1927.

1,617,079

UNITED STATES PATENT OFFICE.

FRANK T. POWERS, OF NEW YORK, N. Y., ASSIGNOR TO POWERS PHOTO ENGRAVING COMPANY, OF NEW YORK, N. Y., A CORPORATION OF NEW YORK.

PHOTOGRAPHIC APPARATUS.

Original application filed February 19, 1918, Serial No. 218,059. Allowed May 18, 1921. Abandoned and refiled July 24, 1923, Serial No. 653,618. Divided and this application filed December 7, 1921. Serial No. 520,620.

The invention relates to photographic apparatus, and in certain respects more particularly to apparatus which is especially adapted for copying work.

Objects and advantages of the invention will be set forth in part hereinafter, and in part will be obvious herefrom, or may be learned by practice with the invention; such objects and advantages being attained through the means and combinations pointed out in the appended claims.

The invention consists in the novel parts, constructions, arrangements, combinations and improvements herein shown and described.

The accompanying drawings, herein referred to and constituting a part hereof, illustrate one embodiment of the invention, and together with the description serve to explain the principles thereof.

Of the drawings:—

Fig. 1 is a vertical, longitudinal section through the camera.

Fig. 2 is a fragmentary elevation of the rear of the camera, showing certain controls for the feeding mechanism for the sensitized web;

Fig. 3 is a detail of the gauge or stop shown at the top of Fig. 2;

Fig. 4 is an enlarged fragmentary elevation, partly in section, of the throw-off for the feed rolls for the sensitized web; and Fig. 5 is a horizontal section of a detail.

This application is a division of my co-pending application Ser. No. 218,059 filed Feb. 19, 1918, allowed May 18, 1921, refiled July 24, 1923, Ser. No. 653,618.

The invention provides for rapid replacement or changes in the copy and in the sensitized surface within the camera, and thus provides for making successive exposures one after another with great rapidity, as well as expediting the time required for making a single exposure. Other advantages of the invention will be pointed out in part hereinafter, the same cooperating with or flowing out of the foregoing, while other and further advantages will be obvious to those skilled in the art.

Referring in detail to the embodied form of camera, the camera body 1 is shown, having connected therewith the usual extensible and contractible bellows 2, the lens 3 being carried by a support 4 at the front end of the bellows. The lens supporting frame 4 is slidable to and fro upon guideways 5, in a well-known manner, to focus the camera.

Means are provided for indicating the focus for different distances of the copy or other object to be photographed, and as embodied a pointer 6 is supported from the frame 4, the pointer cooperating with a scale 7 fixed to the stationary frame 8.

In accordance with one feature of the invention, and as embodied, there is provided within the camera a web of light-sensitive materialy for receiving successive exposures, one after another, so that it is only necessary to feed forward the web $y$, for the space or distance occupied by an exposure between the successive exposures. In connection therewith, means are provided for readily inserting an unexposed roll, for removing an exposed roll or a portion thereof, and for threading the web through the camera.

As embodied a roll 60 of sensitized film, paper or other suitable material is carried upon a shaft or mandrel 61, the shaft 61 being rotatably supported in side frame pieces 62. In the frame pieces 62 are provided slots 63, preferably primarily upwardly and then downwardly disposed or directed, so that the roll 60 may be easily and readily lifted into position, and will then remain therein until intentionally removed.

The web or strip $y$ of light sensitive material is presented at, and guided past, the focal plane or plane of exposure of the camera by suitable means. The embodied form thereof comprises in part a pair of cooperating guide and feed rollers 64 and 65. The roller 64 is preferably maintained in fixed position, the roller 65 being spring-pressed thereagainst and also movable toward and away therefrom to facilitate the introduction of a new web or strip $y$ into the camera.

The embodied form of means for effecting these functions comprises a pair of slots 66 (Figs. 1 and 4) formed in the frame plates 62, the pintles 67 of the roller 65 projecting through the respective slots 66. The pintles 67 are acted upon by springs 68, which tend to press the roller 65 resiliently toward the roller 64 with the strip $y$ therebetween. When the roller 65 is lifted upward by the operator it will pass to and be held in the position shown in Fig. 2, thereby maintaining the rolls 64 and 65 in separated position while the strip is threaded therethrough and when the roll 65 is drawn slightly upwardly and to the right in Fig. 2 it will pass to the spring-pressed feeding position shown in Fig. 1.

A device may be provided to mark the locations of the exposures, such as a point 59 on roller 64, so that the exposures may be located on the strip previous to development if desired.

A second pair of rolls 69 and 70 are shown cooperating with the web $y$ upon the opposite side of the place of exposure in the camera, and these rolls preferably are similar in operation and construction to the rolls 64 and 65, already described. The means for holding off the roll 70 during the threading through of the web, and permitting it to press resiliently against the web during the feeding forward thereof, are indicated generally by reference number 71 in Fig. 1.

Means are provided by the invention for accurately measuring and positioning the successive exposures made upon the sensitive web $y$ and in the embodied form thereof, there is provided on the exterior of the camera (Fig. 2) an arm 72 fixed on the shaft 73 of the roller 64. Cooperating with the arm 72 is a spring stop 74, (Figs. 2 and 3). The arm 72 normally engages the stop 74, and thus the strip $y$ is held stationary. After an exposure is made, the operator presses back the spring 74 so as to clear the arm 72, which arm rotates with the forward feed of the strip or web $y$, but as the arm completes its rotation it engages again with the stop 74 after the web $y$ has been fed forward just sufficiently for the next exposure.

Means are provided for drawing forward and rewinding the strip or web $y$, and the embodied form thereof comprises the shaft 76 having pintles 77 journaled in supporting frames or plates 78 at the sides of the camera. One of the pintles 77 (Fig. 5) is slotted or kerfed at its end, to receive the tongued end of a longitudinally slidable shaft 79. Shaft 79 is provided with suitable turning means, such as a crank or handwheel 80. The shaft 79 is journaled in the camera wall, or other suitable support 81, to have the requisite longitudinal movement. Shaft 79 has formed therein an annular groove 82, into which presses a leaf spring 83, holding the shaft 79 in engagement with the pintles 77. If the spring 83 be pressed backwardly, shaft 79 may be moved longitudinally and the shaft or mandrel 76 may be removed and replaced, and after reengagement of pintles 77 with the shaft 79, spring 83 will cause them to always rotate together.

In accordance with one feature of the invention, the interior of the camera communicates preferably permanently with the dark room, thereby obviating and avoiding the employment of plate or roll holders, and the transporting of the light sensitive rolls or plates to and from the dark room and camera before and after exposing. As embodied (Figs. 1 and 2), the camera body 1 opens at the rear through the wall 88 of the dark room. Thus no closure is required for the end of the camera, which may be always open, and always accessible to the operator, who may remove the exposed roll 85 in whole or in part, and may carry it to the developing apparatus without any covering or protection, and just as the condition or exigencies of the work in the dark room may permit or require. If the use of a plate or plates at any time is requisite or convenient, they may be placed in the camera in the dark room and removed after exposure in the same free and unguarded manner as the strip or web $y$, and developed in the dark room.

The invention in its broader aspects is not limited to the precise constructions herein shown and described, nor to any particular details of construction, but changes may be made therein without departing from the principles of the invention, and without sacrificing its chief advantages.

What I claim is:—

1. A photographic mechanism, including in combination a dark room, a camera having its rear end opening into the dark room, winding and unwinding rollers for a web of light sensitive material, accessible from and demountable into the dark room, and guide members for positioning the light sensitive web at the focal plane of the camera.

2. A photographic mechanism including in combination a dark room, a camera located outside of, but with its rear end opening into, the dark room and means for presenting a light-sensitive element at the focal plane of the camera, said means being operable from without the dark room.

3. A photographic mechanism, including in combination a dark room, a camera having its rear end opening into the dark room, winding and unwinding rollers for a web of light sensitive material, accessible from and demountable into the dark room, means, accessible from without the dark room for turning the winding roller, and guide members for positioning the light sensitive web at the focal plane of the camera.

4. A photographic mechanism including in combination a dark room, a camera with its rear end opening into the dark room, winding and unwinding rollers for presenting a web of sensitized material at, and traveling it past the focal plane of, the camera, and supports for the rollers accessible from the dark room from which supports the rollers may be dismounted.

5. A photographic mechanism including in combination a dark room, a camera with its rear end opening into the dark room, winding and unwinding rollers for presenting a web of sensitized material at, and traveling it past the focal plane of, the camera, the rollers being accessible from the dark room.

6. A photographic mechanism including in combination a dark room, a camera located outside of, but with its rear end opening into, the dark room and means for presenting a light-sensitive element at the focal plane of the camera, and means operable from within the dark room for inserting and removing the light sensitive element, and means operable from without the dark room for presenting a new sensitized element for exposure.

7. A photographic mechanism including in combination a dark room, a camera with its rear end opening into the dark room, winding and unwinding rollers for presenting a web at, and traveling it past the focal plane of, the camera, and supports for the rollers accessible from the dark room from which supports the rollers may be dismounted, and means operable from without the dark room for winding the web.

8. A photographic mechanism including in combination a dark room, a camera with its rear end opening into the dark room, rolls within the camera and accessible from the dark room for placing a web of light sensitive material for exposure within the camera, and means accessible from without the dark room for winding the web an exposure length at a time.

9. A photographic mechanism including in combination a dark room, a camera with its rear end opening into the dark room, rolls within the camera and accessible from the dark room for placing and removing a web of light sensitive material before and after exposure within the camera, and means accessible from without the dark room for winding the web and means for stopping the web after the feed of an exposure length.

10. A photographic mechanism including in combination a dark room, a camera with its rear end opening into the dark room, rolls within the camera and accessible from the dark room for placing a web of light sensitive material for exposure within the camera, and means accessible from without the dark room for winding the web and means operating automatically for stopping the web after the feed of an exposure length.

11. A photographic mechanism including in combination a dark room, a camera with its rear end opening into the dark room, rolls within the camera and accessible from the dark room for placing a web of light sensitive material for exposure within the camera, and means for winding the web an exposure length at a time.

12. A photographic mechanism including in combination a dark room, a camera with its rear end opening into the dark room, rolls within the camera and accessible from the dark room for placing a web of light sensitive material for exposure within the camera, means for winding the web, and means for stopping the web after the feed of an exposure length.

13. A photographic mechanism including in combination a dark room, a camera with its rear end opening into the dark room, rolls within the camera and accessible from the dark room for placing and removing a web of light sensitive material before and after exposure within the camera, means for winding the web, and means operating automatically for stopping the web after the feed of an exposure length.

14. A photographic mechanism including in combination a dark room, a camera with its rear end opening into the dark room, winding and unwinding rollers for presenting a web of sensitized material at, and traveling it past the focal plane of, the camera, the rollers being dismountable into the dark room.

15. A photographic mechanism including in combination a dark room, a camera opening at its back into the dark room, means for winding a sensitized web past the lens of the camera for exposure including a receiving roll within the camera, means outside the dark room and camera for winding the roll, said roll being demountable into the dark room.

16. A photographic mechanism including in combination a dark room, a camera opening at its back into the dark room, means for winding a sensitized web past the lens of the camera for exposure including a tension roll within the camera, means outside the dark room and camera for winding the roll, said means being detachable from the roll to permit the roll to be dismounted into the dark room.

17. A photographic mechanism including in combination a dark room, a camera opening at its back into the dark room, means, accessible from within the dark room, for supporting a supply roll and a wind-up roll for the film, and means for guiding the film past the exposure position in the camera.

18. A photographic mechanism including in combination a dark room, a camera opening at its back into the dark room, means, accessible from within the dark room, for supporting a supply roll and a wind-up roll for the film means outside the dark room and the camera for operating the wind-up roll, and means for guiding the film past the exposure position in the camera.

In testimony whereof, I have signed my name to this specification.

FRANK T. POWERS.